J. B. HART.
FRUIT GRADING MACHINE.
APPLICATION FILED MAR. 22, 1909.
1,048,963.
Patented Dec. 31, 1912.
3 SHEETS—SHEET 1.
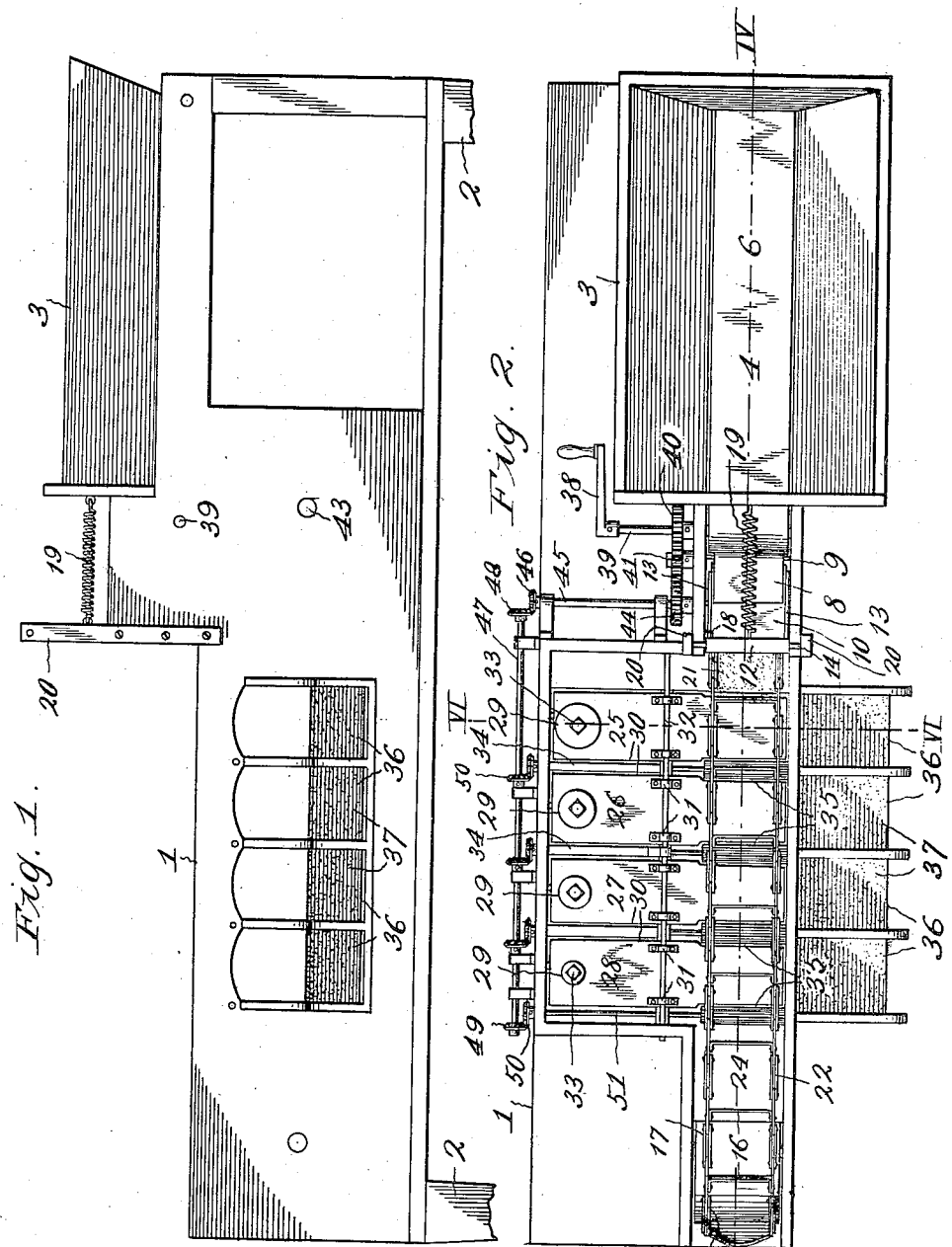
Witnesses:
R. E. Hamilton
M. Cox
Inventor,
J. B. Hart,
By F. G. Fischer,
Atty J. B. HART.
FRUIT GRADING MACHINE.
APPLICATION FILED MAR. 22, 1909.
1,048,963.
Patented Dec. 31, 1912.
3 SHEETS—SHEET 2.
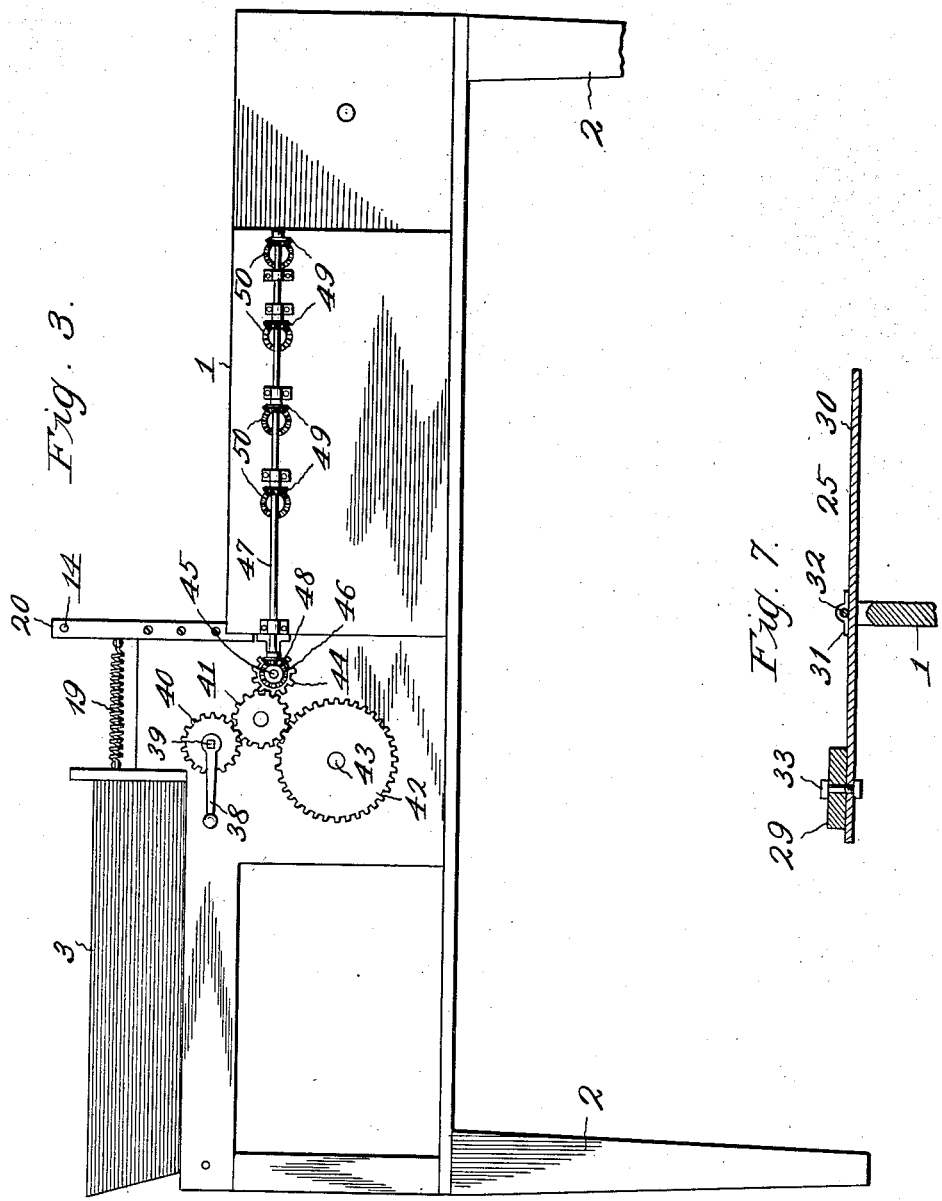
Witnesses:
R. L. Hamilton
M. Cox
Inventor,
J. B. Hart,
By F. G. Fischer,
Atty.

J. B. HART.
FRUIT GRADING MACHINE.
APPLICATION FILED MAR. 22, 1909.
1,048,963.
Patented Dec. 31, 1912.
3 SHEETS—SHEET 3.
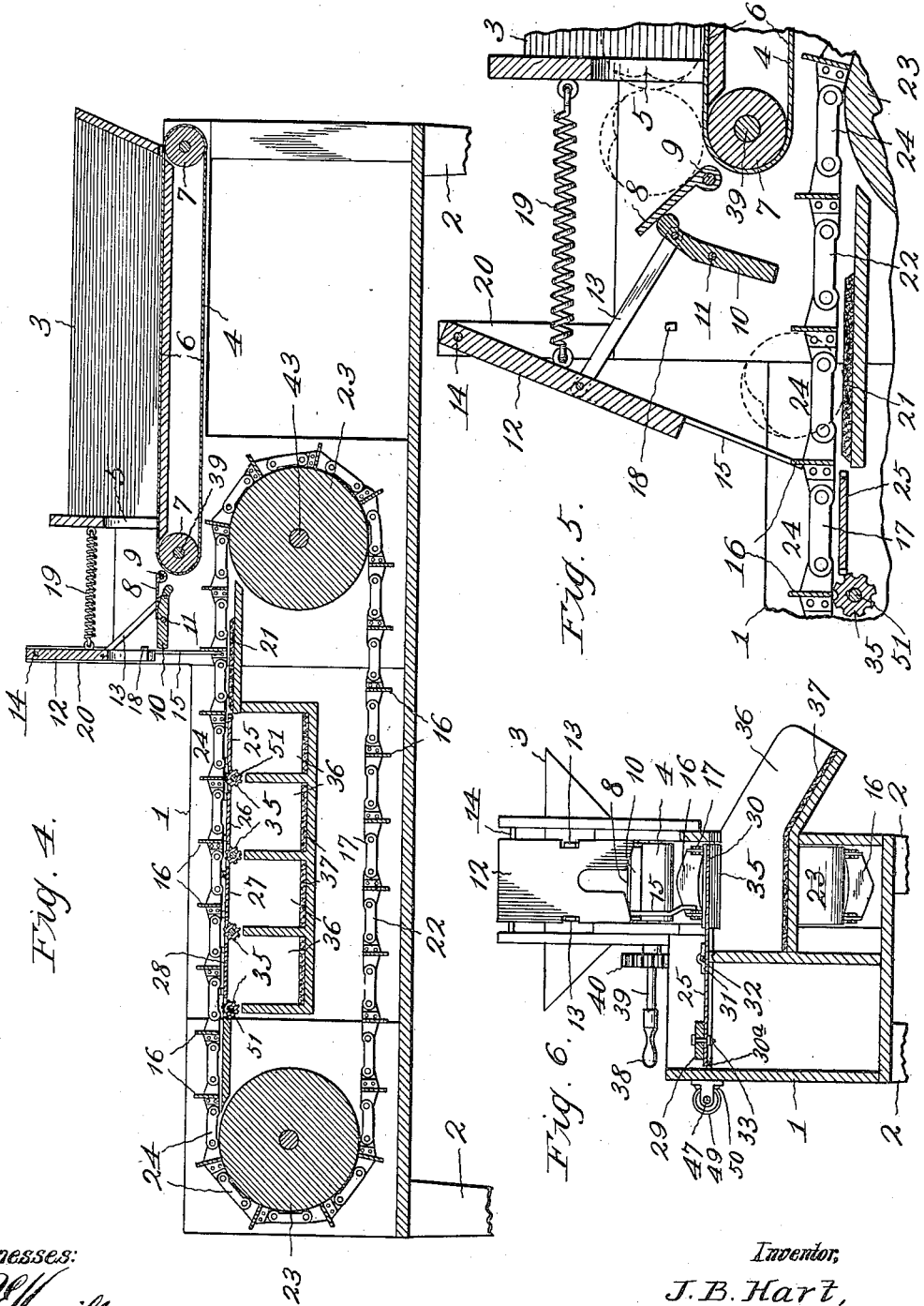
Witnesses:
Inventor,
J. B. Hart,
By F. G. Fischer,
Atty.

UNITED STATES PATENT OFFICE.

JOHN B. HART, OF AUSTIN, COLORADO.

FRUIT-GRADING MACHINE.

1,048,963.  Specification of Letters Patent.  Patented Dec. 31, 1912.

Application filed March 22, 1909. Serial No. 485,024.

*To all whom it may concern:*

Be it known that I, JOHN B. HART, a citizen of the United States, residing at Austin, in the county of Delta and State of Colorado, have invented certain new and useful Improvements in Fruit-Grading Machines, of which the following is a specification.

My invention relates to improvements in fruit grading machines, and my principal object is to provide a machine for grading or sorting fruit according to weight instead of to size as has heretofore been customary.

The machine in its preferred form embraces a hopper for holding the fruit to be graded, a series of scales for weighing and sorting the fruit, a conveyer for conducting the fruit from the hopper to the scales, and means for regulating the passage of the fruit from the hopper to the conveyer.

In order that the invention may be fully understood, reference will now be made to the accompanying drawings, in which:

Figure 1 shows a side elevation of my fruit grading machine. Fig. 2 is a plan view of the same. Fig. 3 shows the reverse side of the machine to that shown in Fig. 1. Fig. 4 is a central longitudinal section on line IV—IV of Fig. 2. Fig. 5 is an enlarged broken section on the plane of line IV—IV. Fig. 6 is a cross section on line VI—VI of Fig. 2. Fig. 7 is an enlarged section of one of the scales on the plane of line VI—VI.

In carrying out the invention I employ a frame 1, mounted upon legs 2.

3 designates a hopper upon the upper rear portion of the frame to receive the fruit to be graded.

4 designates a conveyer for conducting the fruit from the hopper through the opening 5 in the forward end of the same. Conveyer 4 consists of an endless belt 6 and a pair of rollers 7, around which said belt travels.

8 designates a cut-off at the forward end of the conveyer 4. Said cut-off is pivotally-mounted at its rear end 9 and rests at its forward end upon a valve 10, fulcrumed upon a pin 11, and operably-connected to a gate 12 by a pair of connecting-bars 13. Gate 12 is pivotally-mounted at its upper end on a pin 14 and its lower bifurcated end is provided with a depending finger 15, which normally extends into the path of a series of floats 16, forming part of a conveyer 17. Gate 12 is held in its normal position against a stop 18 by a retractile spring 19, secured to the gate and the forward end of the hopper. Pin 14 is mounted in a pair of standards 20 extending upward from the adjacent portion of frame 1.

21 designates a cushion upon which the fruit rolls when discharged from valve 10.

Conveyer 17 consists of the floats 16, links 22 to which the floats are secured, and rollers 23 around which the chains travel. The floats 16 divide the conveyer into a series of bottomless compartments 24 which prevent the fruit from crowding while being conveyed to or across the scales whereby it is weighed and assorted.

In the drawings I have shown four scales 25, 26, 27, and 28, although this number may be added to or deducted from, according to the number of different grades it is desired to sort the fruit into. The scales contain counterweights 29 of different sizes, that on scale 25 being the largest, and the one on scale 28 the smallest. This arrangement permits the heaviest fruit to be sorted first, while the lighter fruit passes on to the other scales, and the lightest, which fails to operate the last scale, to discharge from the rear end of the conveyer. Each scale, in addition to its counterweight, consists of a platform 30, provided near its central portion with bearings 31 which are loosely-mounted on a rod or shaft 32, secured in the upper portion of frame 1. Platforms 30 are normally held against stops 30ª by the counterweights 29.

Counterweights 29 are secured in position by bolts 33, so that they may be removed and lighter or heavier weights substituted therefor to accommodate the different kinds of fruit to be graded. The outer or weighted ends of platforms 30 are separated by partitions 34, while their inner ends which extend beneath the upper strand of the conveyer 17, are separated by corrugated-rollers 35, the upper surfaces of which extend slightly above the upper surfaces of the platforms, as shown in Figs. 4 and 5. The inner end of each platform 30 extends above a discharge chute 36 beneath which separate receptacles, not shown, may be placed to catch the sorted fruit. Chutes 36 are provided with cushions 37 to prevent the fruit from being bruised when it rolls into the chutes from the scales.

The machine may be operated by hand-power or by a motor. In Figs. 2 and 3 I have shown it provided with a crank 38, so that it may be operated by hand. Said crank is mounted upon a shaft 39 carrying the front roller 7 of conveyer 4. Shaft 39 is also provided with a cog-wheel 40 which intermeshes with an intermediate idler 41, which in turn drives a cog-wheel 42 mounted upon a shaft 43, carrying the rear roller 23 of the conveyer 17. Idler 41 also intermeshes with a cog-wheel 44, mounted upon a shaft 45 and provided at its outer end with a bevel gear wheel 46, which drives a shaft 47 through the intermediacy of an intermeshing bevel gear 48. Shaft 47 is provided with a series of bevel gears 49, which drive a series of bevel gears 50, mounted upon shafts 51, carrying the rollers 35.

In practice fruit, such for instance as peaches, is placed in the hopper 3, and conducted therefrom one at a time through opening 5 by the conveyer 4. When the first peach reaches gate 12 it remains against the same until said gate is operated by one of the uppermost floats of conveyer 17 contacting therewith, and carrying it back to the position shown in Fig. 5. This movement of the gate opens valve 10, so that the peach can drop therethrough into the compartment 24 which happens to be passing beneath the valve at that time. As valve 10 opens, its rear end lifts the free end of the cut-off 8 into the path of the second peach which is prevented thereby from dropping down upon the first one. As the conveyer 17 moves forward, the float will pass out of engagement with finger 15 of the gate, and allow the latter to be drawn back against the stop 18 by the spring 19, where it remains inoperative until it is actuated by the succeeding float when the operation above mentioned will be repeated, and the second peach will be allowed to drop into the following compartment. The first peach will then be carried forward over the scales until it over-balances one of the counterweights, tips the platform of the scale, and drops into the chute beneath the same, from which it discharges into a receptacle, not shown. Should the peach be almost heavy enough to over-balance the weight on scale 25, for instance, but fail to depress the inner end of said scale sufficiently to drop through into the chute, said peach will be carried upward onto the next scale by the rotating roller 35 and the following float.

By having the floats 16 operate the gate 12, the valve will be opened at the proper time to drop the fruit into each compartment. It also prevents the fruit from becoming bruised, which would likely occur if it had to push against the gate with sufficient force to open the same and trip the valve. The fruit is further protected from damage by providing the cushions 21 and 37 for it to roll upon.

When desired any number of machines may be set side by side and operated with one set of gearing, by extending the conveyer shafts through the conveyers of the duplicate machines.

While I have shown the preferred form of my invention, I, of course, reserve the right to make such changes in form, proportions, and details of construction, as properly fall within the spirit and scope of the appended claims.

Having thus described my invention, what I claim is:—

1. In a machine for grading fruit, the combination of a series of scales for assorting fruit of different weights, means for conducting the fruit to said scales, and rollers mounted between the scales.

2. In a machine for grading fruit, the combination of a series of scales for assorting fruit of different weights, means for conducting the fruit to said scales, and driven corrugated rollers mounted between the scales.

3. In a fruit sizing machine, the combination of a plurality of levers having flat tops, a counterweight for each lever, and a conveyer for carrying fruit to be sized over the tops of said levers.

4. In a fruit sizing machine, the combination of a plurality of levers having flat tops, a counterweight for each lever, and a conveyer for carrying fruit to be sized over the tops of said levers, said weights decreasing in size in the line of progress of the conveyer.

5. In a fruit sizing machine, the combination of a plurality of levers having flat tops and having their pivots in alinement, a receiving chute adjacent the outer end of each lever, a conveyer for causing specimens of fruit to pass over the tops of said levers, and a balance weight for each of said levers, said balance weights progressively decreasing in mass in the direction of the line of movement of the conveyer, whereby the heaviest specimens of fruit will tilt one of the levers and be dropped first, and the lightest specimens will be dropped last.

6. In a fruit sizing machine, the combination of a plurality of levers having alined fruit supporting surfaces, a counterweight for each lever, and a conveyer for carrying fruit to be sized over the supporting surfaces of said levers.

7. In a fruit sizing machine, the combination of a plurality of levers having alined fruit supporting surfaces, a counterweight for each lever, and a conveyer for carrying fruit to be sized over the supporting surfaces of said levers, said weights decreasing in size in the line of progress of the conveyer.

8. In a fruit sizing machine, the combination of a plurality of levers having alined fruit supporting surfaces and having their pivots in alinement, a receiving chute adjacent the outer end of each lever, a conveyer for causing specimens of fruit to pass over the supporting surfaces of said levers, and a balance weight for each of said levers, said balance weights progressively decreasing in mass in the direction of the line of movement of the conveyer, whereby the heaviest specimens of fruit will tilt one of the levers and be dropped first and the lightest specimens will be dropped last.

In testimony whereof I affix my signature, in the presence of two witnesses.

JOHN B. HART.

Witnesses:
 IRVINE M. McMURRAY,
 WILLIAM S. GIRARDET.